May 7, 1940.  W. DALLENBACH  2,200,023
ULTRA-HIGH-FREQUENCY OSCILLATION APPARATUS
Filed Sept. 10, 1937  3 Sheets-Sheet 1
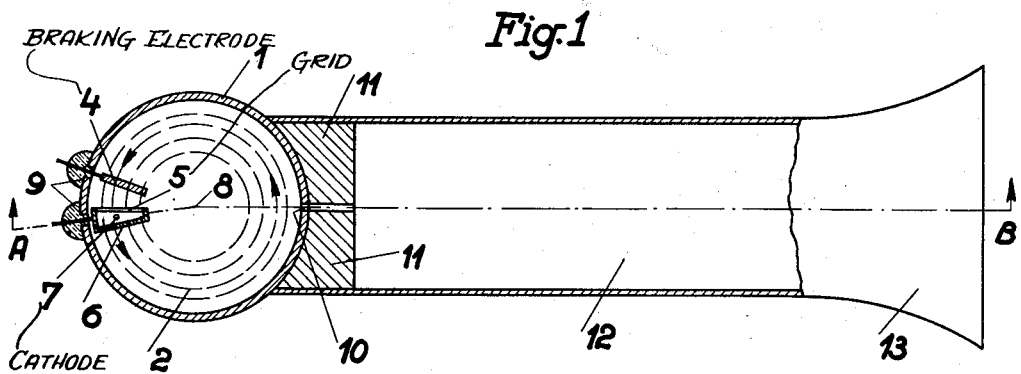
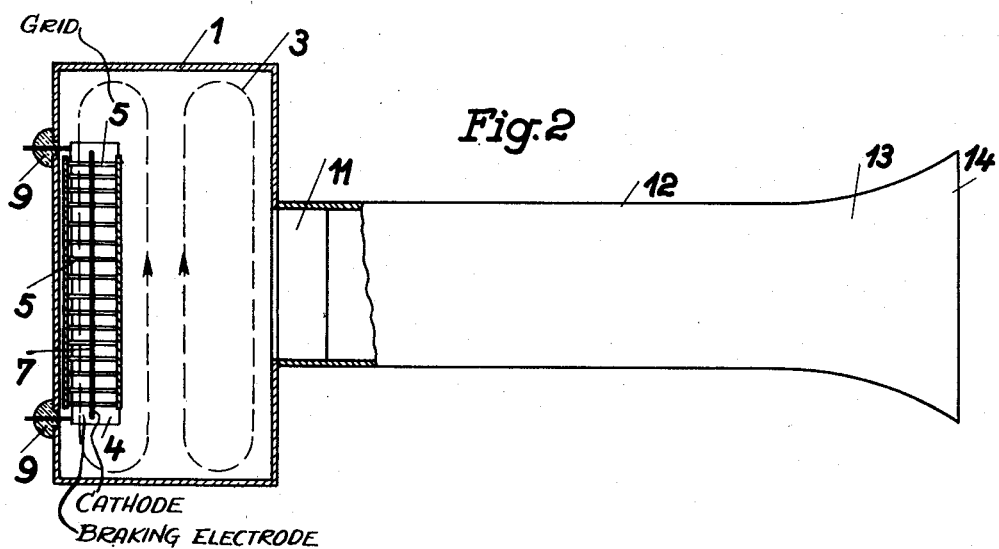
Inventor-
Walter Dallenbach Inventor:
Walter Dallenbach Patented May 7, 1940

2,200,023

UNITED STATES PATENT OFFICE 2,200,023

ULTRA-HIGH-FREQUENCY OSCILLATION APPARATUS

Walter Dallenbach, Berlin-Charlottenburg, Germany, assignor to Julius Pintsch Kommandit-Gesellschaft, Berlin, Germany Application September 10, 1937, Serial No. 163,318
In Germany September 10, 1936

16 Claims. (Cl. 250—36)

The invention relates to apparatus, especially electron tubes, for the production, amplification, or reception of ultra-high-frequency oscillations, in particular within the sphere of decimeter or centimeter waves.

According to the invention a resonator and exciting electrodes are provided in such a manner that upon and from the external surfaces of the electrodes between the internal surfaces of which the exciting electric field is produced there impinges and is discharged a stream of electrical field lines of the resonator which is discharged from and impinges upon one and the same conducting surface of the resonator, or (preferably) extends entirely in the dielectric in the form of endless eddy-lines.

Accordingly there may serve as a resonator according to the invention for example an electric dipole of the length $\lambda/2$ wherein $\lambda$ is the resonant wave length of the resonator. In this case the electric field lines extend, as is known, substantially from one end of the dipole to the other through the surrounding dielectric, which ordinarily consists of air, or, in the case of the arrangement of the dipole in a vacuum vessel, in a more or less highly rarified medium. If, now, there is arranged in this stream of electrical field lines an electrode system, for example after the manner of a plate condenser, so that the electrode plates cut the electrical field lines of the dipole (in the dielectric) perpendicularly, the latter are practically unimpeded in their passage through the electrode plates. If excitation is effected by the electrodes being connected for example in a braking-field network, there can consequently be excited oscillations the wave-length of which is determined by the natural wave length of the dipole. Also the length of the cylinder may be any odd multiple of $\lambda/2$ thus conforming to the function $$\frac{2n-1}{2}\lambda$$

wherein $n$ is any whole number. Similarly the diameter of the cylinder has definite relations to the wave length $\lambda$ which may be expressed by either the formula $(2n-1)\lambda$ or the formula $$\frac{(2n-1)\lambda}{2}$$

In particular, now, according to the invention there is used as a resonator a hollow body, as a hollow cylinder (of metal), excited into its natural oscillations, without a middle conductor. This is according to the invention preferably arranged within the tube, or so that it itself forms the wall of the tube. The hollow cylinder without a middle conductor is a preferred constructional form of the invention, by means of which, moreover, the interesting forms of oscillation of the hollow body can be most simply explained. In the following, therefore, reference will be made particularly to the hollow body without a middle conductor, and, in fact, with a circular cross-section, although the hollow body serving as a resonator according to the invention may have other forms, and other preferred forms are for example the torus and the hollow sphere. What is described for the hollow cylinder may of course be applied to these other hollow bodies (without a middle conductor).

The following particulars are, further, made on the assumptions that the dielectric filling the hollow cylinder consists of air or a more or less highly rarified medium and that the wall of the hollow cylinder or at least the internal surface of the hollow cylinder bounding the dielectric has or have a practically infinitely large conductivity.

The latter is practically complied with since the walls or the internal surfaces of the cylinder consist of a metal, as copper or silver.

First of all, there will be considered a hollow cylinder in infinite length. Let its internal diameter be $d$. Such a cylinder has a number of natural wave lengths the magnitude of which depends on the magnitude of the diameter ($d$). To each natural wave length there pertains a quite definite form of oscillation—i. e. a quite definite course of the electrical and magnetic lines of force. The natural wave lengths of the cylinder can be calculated by integration of the Maxwell equations and insertions of the limiting conditions, and a picture of the form of the oscillation and consequently of the course of the lines of force can be thereby made. Clearly considered, the different forms of oscillation consist in that stationary waves are excited in the chamber of the cylinder in a direction perpendicular to the axis or in a plane extending perpendicularly to the axis.

Now there results, for example, a natural oscillation or form of oscillation in the case of which the electrical field lines extend through the dielectric between different parts of the internal surface of the cylinder, which may be located in different cross-sections or in one and the same cross-section (the cross-section being regarded as perpendicular to the axis of the cylinder). There are in question consequently streams of field lines which arise at and discharge upon conducting surfaces or surface charges, and consequently in question field lines with sources and depressions. According to the invention the exciting electrodes may be provided in the manner stated in such a stream of lines of force extending through the dielectric.

In the case of other natural oscillations or forms of oscillation the electrical field lines are partly field lines of the above mentioned kind (with sources and depressions) and partly field lines that are endless eddy lines and extend entirely in the dielectric. According to the invention the electrodes may be provided in a stream of field lines of one or the other kind, or partly in a stream of field lines of one kind and partly in a stream of field lines of the other kind.

In particular, however, according to the invention there is used a natural oscillation or form of oscillation of the hollow body or hollow cylinder in which the electrical field lines are preferably exclusively endless eddy lines that extend in the dielectric. The field lines are circles concentric to the axis of the cylinder (in a cross-section drawn perpendicularly to the axis of the cylinder). The electrical strength of the field must have at the edge $$\left(\text{for } r=\frac{d}{2}\right)$$

and also at the axis (for $r=0$) the value zero. The length of the diameter of the cylinder must therefore be "equivalent" to a wave length. It is—for the basic wave—not exactly a whole wave length, but has a somewhat greater value $(1\cdot 2.\lambda)$, since the natural wave and the diameter of the cylinder are related by a zero root of a Bessel function. Between $$r=0 \text{ and } r=\frac{d}{2}$$

there are endless field lines that extend solely in the dielectric.

Now according to the invention the electrodes, which are advantageously flat electrodes, are arranged in this field-line stream in such a manner that the field lines impinge upon and arise at the external surfaces perpendicularly. Advantageously the electrodes are arranged and dimensioned in such a manner that they are located with their entire radial width in a potential loop place $$\left(\text{between } r=0 \text{ and } r=\frac{d}{2}\right)$$

In particular, according to a further feature of the invention, the electrodes may be so arranged and dimensioned that they are located in a position specially favourable for the excitation, regard being had to the finite length of the cylinder.

Again, if the form of oscillation is considered in which the electrical field lines are exclusively endless eddy lines, these are reflected at the open or closed ends of the cylinder. If the axial length of the cylinder is equivalent to half a wave length, there is a potential-node place or a potential-loop place in a plane extending through the middle of the axis of the cylinder according to whether the cylinder is open at both ends or is closed at both ends, for example by metal plates. The exciting electrode system may therefore in the latter case be arranged in an axial direction in a potential loop. Its axial length and its position within the cylinder are to be correspondingly selected.

The special advantage of the use according to the invention of the form of oscillation in the case of which the electrical field lines are exclusively endless eddy lines and the excitation is effected in the manner stated by means of a stream of electrons, consists particularly in that the resonator has an extraordinarily low natural damping and is large in comparison with the wave length. The determination of the diameter of the cylinder alone constitutes a structure capable of resonance. If the cylinder is open at one end or at both ends, it can act at the same time as a radiator since the cross-sectional surface of an open end represents the radiator proper (in a manner similar to that of the acoustic horn). If the cylinder is closed at both ends, all undesired radiation damping may be avoided, so that the natural damping assumes a still lower value.

The coupling of the hollow body or hollow cylinder serving as a resonator, or of the field space thereof, with an energy-conducting device is effected according to the invention preferably, and indeed particularly when the hollow cylinder is metallically closed at both ends, by means of a gap which is provided in the wall of the hollow cylinder or in a closing plate thereof. The gap may be provided in such a manner that in consequence of the course of the electrical and magnetic lines of force a stream of energy passes over from the chamber of the resonator into the energy-conducting device. There is then superposed upon the stationary wave of the resonator an advancing wave, which in its turn excites the energy-conducting device. In the case of the form of oscillation of the rollow cylinder in the case of which the electrical field lines are exclusively endless eddy lines, for example the magnetic field lines extend so to speak in the form of a pipe around the stream of the electric field lines and have a component in the direction of the axis of the cylinder and a component in the direction of the radius of the cylinder, whilst the electrical field lines have only a component perpendicular to the axis of the cylinder and to the radius of the cylinder. There is consequently possible a stream of energy (Poynting vector) in the direction of the radius of the cylinder and a stream of energy in the direction of the axis of the cylinder. Each of these streams of energy may be utilized for the excitation of the energy-conducting device. The gap in the hollow cylinder is to be provided, and the energy conducting device to be coupled is to be arranged, accordingly. The latter consists advantageously of a conductor the electromagnetic field of which is surrounded by a metal casing, in particular in a manner similar to that of the resonator, this consisting of a hollow cylinder without a middle conductor. In the latter case the arrangement may be such that the resonator and the energy-conducting device are excited into the same form of oscillation or into different forms of oscillation—for example, the electrical field lines in the resonator are endless eddy lines but in the energy-conducting device are field lines that arise and terminate at conductors or surface charges. There may thus be produced so to speak a transformation of the forms of oscillation, of the character of the lines of force.

For the further explanation of the essence of the invention there are shown in the accompanying drawings constructional examples thereof, the examples being of the type in which there serves as a resonator a hollow cylinder without a middle conductor in such a form of oscillation that the electrical field lines are exclusively endless eddy lines.

Figures 1 and 2 show an exemplary embodiment of the invention with a cylindrical hollow body as a frequency-determining resonator, Figure 1 being a radial section through the resonator, and Figure 2 an axial section therethrough, the views showing a tubular energy lead connected with the resonator in the direction perpendicular to its rotational axis.

Figure 4:
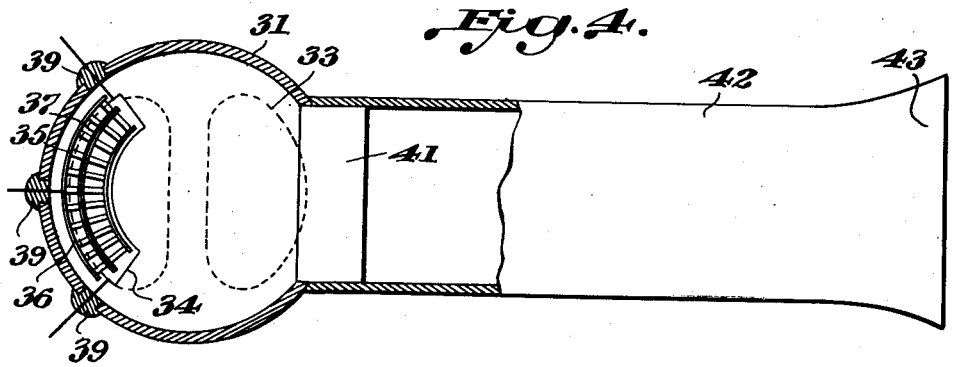
Figures 4 and 5 are two perpendicular (to each other) sections through an arrangement of the invention with a resonator in the form of a hollow sphere, Figure 4 being a section parallel with the electrodes stimulating the resonator to oscillation, and Figure 5 a section perpendicular to these electrodes.
Figure 5:
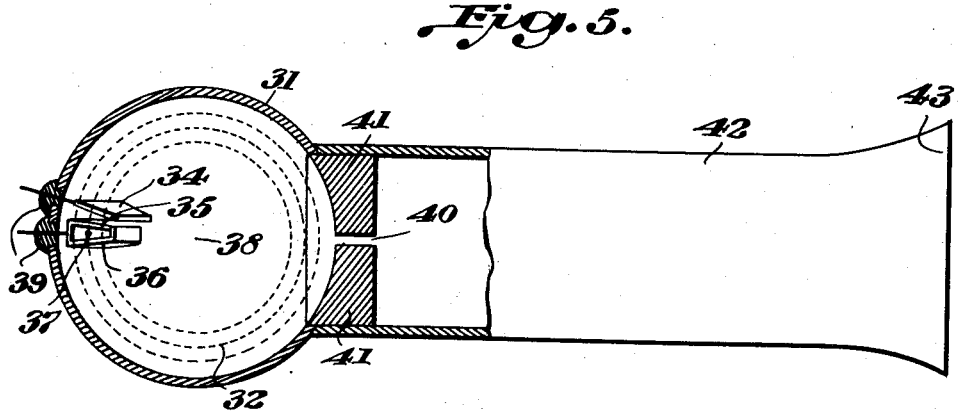

In Figures 1 and 2 there is shown by way of example a cylindrical hollow body 1 made of metal which is metallically closed at its two ends and the axis of which in Figure 1 is perpendicular to the plane of the drawings. The electrical lines of force are shown in Figure 1 as broken circles, whilst the magnetic lines of force 3 extend as is indicated in Figure 2 by broken lines. The electrodes are arranged as surfaces (in particular flat-surfaces) extending perpendicularly to the electrical lines of force. They consequently extend substantially in radial planes. In Figures 1 and 2, 4 indicates a braking electrode which is opposite to a flat grid 5 which consists of radially arranged bars. This grid forms the covering surface, turned towards the braking electrode 4, of a small box 6 which is likewise located in a meridional plane and contains the cathode 7. By this box the cathode 7 is screened in relation to high-frequency oscillations. Contrariwise, both the braking electrode 4 and also the box 6 with the grid 5 present no impediment to the electrical field lines extending around the axis 8, because these field lines impinge perpendicularly upon the electrodes in question. From Figure 2 it will be seen that the cathode 7 may be made in the form of a wire or strip extending parallelly to the axis of the tube. Since no electrical lines of force end in the internal surface of the hollow body 1, and consequently there occur there no electrical charges, the internal surface of the hollow body has the property of a dimensionally extended potential node, and the electrodes 4, 5 and 7 may be extended outwards by supports and leading-in conductors, extending perpendicularly to the electrical lines of force, in any desired manner and at any desired place of the surface of the chamber, as is indicated by the glass-metal fusings 9. Diametrically opposite to the electrode arrangement there is in the chamber a narrow slit 10 which has its longitudinal direction parallel to the axis 8 and which enables coupling to be effected to a tube 12 there being conductively attached to the wall of the chamber 1 at opposite sides of the slit 10 two metal pieces 11 with between them a gap of the width of the slit 10 so that there is a good capacitive connection between opposite sides of the slit 10. This tube widens out at one end into a horn-like extension 13, which can serve as a radiator. Advantageously the tube 12 and the extension 13 are tuned to a length such that no surface currents engage around the outer edge 14 of this horn-like extension, and this edge consequently is a current-node line. The slit 10 may be closed so as to be tight to a high vacuum by a glass-metal fusion so that the hollow body 1 consequently itself is the high-vacuum vessel.

Figure 3:
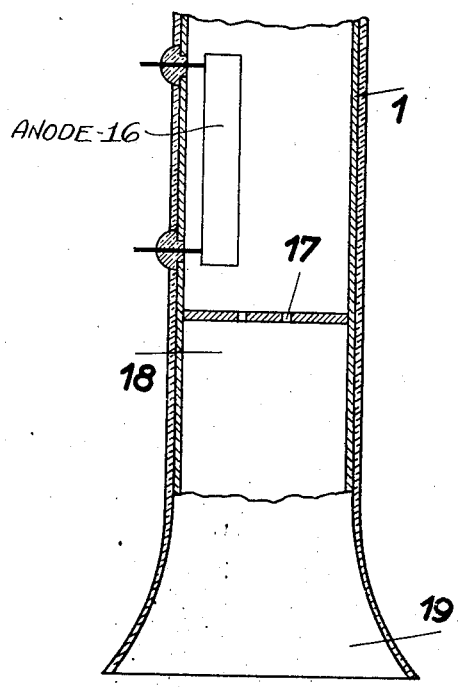
Figure 3 is a section through the rotational axis of the resonator and Figure 3' a section perpendicular to the rotational axis thereof, in which the oscillatory stimulation of the resonator takes place through a two electrode system and a tubular energy lead is connected with the resonator in the direction of the rotational axis.
Figure 3:
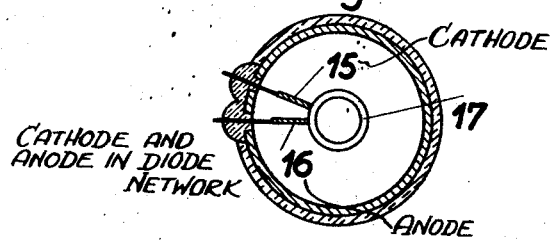

In Figures 3 and 3' there is represented a similar arrangement with the difference that the hollow cylinder 1 co-operates with flat electrodes 16 and 15 which are arranged in radial direction and of which 15 for example represents an oxide cathode and 16 the corresponding anode. To produce oscillation in the cylinder 1 the electrodes 15 and 16 are connected in a diode network. The oscillations that occur in the body 1 of the example shown in Figures 3 and 3' are such that the electric field lines are endless eddy lines. For coupling, there is provided at one end surface of the hollow body an annular slit 17 through which acts the stationary electro-magnetic wave in the interior of the chamber 1 and produces in the energy-conducting device 18 with the horn-like widening 19 waves of the same type as that of the wave in the interior of the hollow body 1—i. e., the electric-field lines of the energy-conducting devices 18 are endless eddy lines. Owing to the difference between the manner of coupling the hollow body 1 and the energy-conducting device 12 in the example shown in Figures 1 and 2 from the manner of coupling the hollow body 1 and the energy-conducting device 18 in the example shown in Figures 3 and 3', the result is very different in the example shown in Figures 1 and 2. In the hollow body 1 shown in Figures 1 and 2 there occur, as shown in Figure 1, electric-field lines in the form of endless eddy lines. The electric field lines extend in the energy-conducting device 12 from one wall of the device to the opposite wall: there are consequently no eddy lines in the energy-conducting device 12 and its horn-like widening 13. In the example according to Figures 1 and 2 there are thus electric endless eddy lines in the resonator or hollow body but in the energy-conducting device 12 there are electric field lines that start and end at the conducting surface. In the case of the example according to Figures 3 and 3', on the contrary, there are electric endless eddy lines both in the resonator 1 and also in the energy-conducting device 18.

In the example shown in Figures 3 and 3' there may be used, instead of the annular gap, a hole provided on the axis of the hollow cylinder 1.

Instead of, as in Figures 1 to 3', using a cathode excited by heating in an ordinary way for producing emission of electrons, it is possible to use cold cathodes in combination with electrical eddy lines in the interior of the chamber, the electrons being liberated as secondary electrons.

In the case of the constructional example shown, the length of the diameter of the cylinder 1 is equivalent to a wave length. Its internal surface represents a potential-node surface. Moreover, there are in the axis 8 of the cylinder (longitudinally thereof) potential nodes. The axis 8 of the cylinder is consequently a potential node line. The axial length of the cylinder 1 is equivalent to twice a wave length.

The natural wave-length $\lambda$, the cylinder radius $$\frac{d}{2}$$

and the axial length $2l$ of the cylinder are in the following relationship:

$$\frac{4\pi^2}{\lambda^2} = \frac{k_m^2}{\left(\frac{d}{2}\right)^2} + \frac{n^2\pi^2}{(2.l)^2}$$

$n$ being a whole number (0, 1, 2 . . .), and $k_m$ the zero root of a Bessel function of zero order. For the form of oscillation in the case of which the electrical field lines are exclusively continuous eddy lines, $n$ is to be made equal to 1 in the equation given, whilst $k_m$ (for $m=1$) has the value 3.83. The surfaces of the electrodes are to be so dimensioned that the electrodes are radially in a potential loop or in the immediate neighbourhood thereof and are axially also in a potential loop (in the plane passing through the middle of the axis of the cylinder) but extend a considerable distance beyond the neighbourhood of the potential loop.

In the case of the constructional examples represented, the planes of the electrodes (the anode 4 and the grid 5 of Figs. 2 and 3, and the anode 15 and the cathode 16 of Fig. 3') extend radially. In many cases it suffices instead of this to arrange these planes of the electrodes parallel to one another, in particular when or where it is a question of small distances apart of electrodes. This presents also the advantage that the exciting field between the internal surfaces of the electrodes may be made as homogenous as possible.

A preferred constructional form of the invention consequently consists in arranging the preferably plate-shaped electrode system (with parallel plates) quite simply outside the axis of the cylinder (consequently not symmetrically to the axis of the cylinder, but laterally thereof in the field-line current). In the case of the arrangement according to Figs. 3 and 3', this signifies for example that the cathode 16 remains in the position shown (in a radial plane) but the anode 17 is so arranged that its surface is parallel to that of the cathode 16. The arrangement according to Figs. 1 and 2 can be arranged similarly, the anode 5 being arranged for example in a plane parallel to the grid 5. Also, the box 6 may, instead of that shown, have a cross-section of the form of a rectangle.

Figure 6:
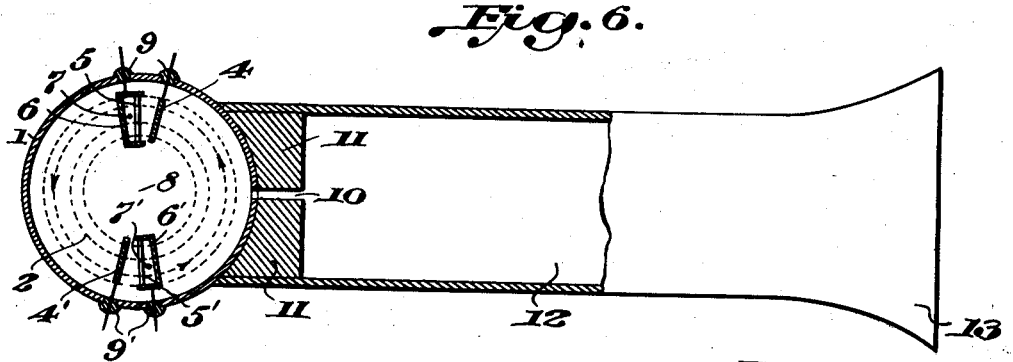
Figure 6 is a section perpendicular to the rotational axis of the resonator of an arrangement such as shown on Figure 1, but with two electrode systems disposed in the resonator.

Finally, there may be arranged spatially one behind another in the direction of flow of the field lines (2) several electrode systems for example of the kind shown or of the kind just described. The several electrode systems may be placed in such a manner that they are "traversed" either in the same direction or in different directions by the electrical eddy lines 2. Figure 6 shows an arrangement in which two electrode systems 4, 5, 7 and 4', 5', 7' are arranged symmetrical to the rotational axis 8 of the resonator and are intersected by the electrical eddy lines 2. Oscillatory stimulation of the resonator takes place in this case by means of two electrode systems connected, so to speak, in parallel and acting in the same phase on the resonator. For the case in which the electrodes are intersected in different direction by the electrical eddy lines, the oscillatory stimulation of the resonator should take place in phase opposition. If the latter is the case regard must be had to the phase position of the excitation. If, for example, there are provided two electrode systems that are diametrically opposite to one another (on a diameter), of which one is arranged on the right and the other on the left of the axis 8 in the direction of flow of the field lines (2), the electrode systems are traversed in different directions by the electrical eddy lines 2. The two electrode systems are therefore advantageously so provided or connected that they oscillate oppositely. For this purpose the arrangement may be such that the two plate-shaped electrode systems oscillating oppositely are carried by conductors or are formed by the ends of conductors extending (symmetrically to the axis 8) along a cylinder diameter and from one potential loop to another. The said conductors may for example consist of parallel strips in such a manner that the two ends of one strip form the two anodes, the two ends of a second strip constitutes cathodes, and maybe a third strip may be arranged between these two strips to form at its ends the two grids, the third strip being provided with suitable recesses or being formed after the manner of a grating.

Further preferred constructional forms of the invention consist in the employment as a resonator or hollow body of a torus or a hollow-sphere. These hollow bodies may according to the invention be excited in one of the different natural oscillations. A preferred constructional form of the invention in the case of these hollow bodies consists in that they are excited into such a form of oscillation that the electrical field lines are endless eddy lines. In the case of a hollow sphere, the electrodes for example the advantageously flat electrodes are for example advantageously arranged in such a manner that their planes extend substantially in meridional planes of the sphere.

For the case in which the resonator or hollow body or hollow cylinder according to the invention is arranged within a tube with a glass wall, a special constructional form of the invention consists in that the hollow body, in particular a hollow cylinder, is carried exclusively by leading-in wires, if required leading-in wires and holding wires, which are on the one hand fastened in or to the cylinder wall and on the other hand are fused into a squeeze. In this way the manufacture is very simple. The squeeze is the single carrier of the hollow body or hollow cylinder, which in its turn contains the electrode system. In this case the hollow cylinder serving as a resonator may be open at both ends and serve at the same time as a radiator. In other cases the hollow cylinder is metallically closed at one end or both ends. In this case the energy-conducting device coupled to the hollow body or hollow cylinder and advantageously serving also as a radiator may be co-arranged within the tube.

A particular advantage that can be produced with the subject-matter of the invention consists in that in a simple way the electromagnetic field of the resonator can be metallically enclosed in the energy-conducting device as far as the radiator proper or the surface serving as a radiator.

The electrode system serving for the excitation of the resonator may be a three-grid tube or a diode or a multiple-grid system, for example after the manner of a pentode. The electrode system may work with self-excitation or external excitation (external control). For the excitation of the electrode system with self-excitation there may be used a braking-field network a back-coupling network or in special cases even a magnetron network.

What I claim is:

1. Means for producing ultra high frequency electromagnetic oscillations, including a hollow metallic walled resonator formed as a geometrical figure having at least one rotational axis and having the internal diameter of its cross section pendicular to the said axis equal to the desired wave length multiplied by a factor forming one of the group comprising $$\frac{(2n-1)}{2}$$

and $(2n-1)$ wherein $n$ is a whole number, and means to establish in said resonator an ultra high frequency field whose electrical lines of force are closed eddy lines, said field producing means comprising electrodes including at least one anode and one cathode, said electrodes being disposed within the resonator on planes radial to said axis.

2. The device of claim 1, characterized by having the resonator closed to form a vacuum vessel.

3. The device of claim 1 characterized by having the resonator formed as a hollow cylinder.

4. The device of claim 1, characterized by having the resonator formed as a hollow cylinder, the axial length of which equals the wave length multiplied by $$\frac{2n-1}{2}$$

wherein $n$ is a whole number.

5. The device of claim 1, characterized by having the resonator formed as a hollow cylinder closed at its ends by metallic walls.

6. Means for producing ultra high frequency electromagnetic oscillations, including a hollow metallic walled cylinder, the diameter of which is equal to half the wave length to be produced multiplied by an integer, and means to establish in said resonator an ultra high frequency field whose electrical lines of force are closed eddy lines, said field producing means comprising electrodes including at least one anode and one cathode, said electrodes being disposed within the resonator on planes radial to the axis of the cylinder.

7. The device of claim 1, characterized by having the hollow resonator formed as a cylinder and the electrodes located wholly between the axis of the cylinder and the cylinder wall.

8. The device of claim 1, characterized by having the resonator formed as a hollow cylinder and the electrodes formed as flat strips located wholly between the axis of the cylinder and the cylinder wall.

9. The device of claim 1, characterized by having the resonator formed as a hollow cylinder and the electrodes formed as flat strips located wholly between the axis of the cylinder and the cylinder wall with the radial dimensions of the electrodes less than one half the diameter.

10. Means for producing ultra high frequency electromagnetic oscillations, including a hollow metallic walled resonator formed as a geometrical figure having at least one rotational axis and having the internal diameter of its cross section perpendicular to the said axis equal to the desired wave length multiplied by a factor forming one of the group comprising $$\frac{(2n-1)}{2}$$

and $(2n-1)$ wherein $n$ is a whole number, and means to establish in said resonator an ultra high frequency field whose electrical lines of force are closed eddy lines, said field producing means comprising a plurality of sets of electrode systems located within the cylinder at diametrically opposite points and each system including an anode and a cathode.

11. The device of claim 10, having the electrodes disposed in planes radial to said rotational axis.

12. The device of claim 1, characterized by having the resonator in the form of a hollow sphere.

13. The device of claim 1, characterized by having the resonator in the form of a hollow sphere and having the planes in which the electrodes lie constituting meridional planes of the sphere.

14. The device of claim 1, characterized by having the resonator provided with a window, and means leading from the window for directing the wave issuing through the window.

15. The device of claim 1, characterized by having the resonator provided with a window, and a tubular lead extending from the window provided portion of the resonator.

16. The device of claim 1, characterized by having conductor leads passing through the walls and connected to the electrodes and insulated from the walls, said device being further characterized by having the resonator surrounded by a gas-tight receptacle constituting a vacuum vessel.

WALTER DALLENBACH.